(12) United States Patent
Jain et al.

(10) Patent No.: US 11,533,495 B2
(45) Date of Patent: Dec. 20, 2022

(54) HIERARCHICAL VIDEO ENCODERS

(71) Applicant: Google LLC, Mountain View, CA (US)

(72) Inventors: Vihan Jain, San Francisco, CA (US);
Joonseok Lee, Fremont, CA (US);
Ming Zhao, Sunnyvale, CA (US);
Sheide Chammas, San Francisco, CA (US); Hexiang Hu, Los Angeles, CA (US); Bowen Zhang, Los Angeles, CA (US); Fei Sha, Los Angeles, CA (US);
Tze Way Eugene Ie, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/162,150

(22) Filed: Jan. 29, 2021

(65) Prior Publication Data

US 2022/0256175 A1 Aug. 11, 2022

(51) Int. Cl.
*H04N 19/30* (2014.01)
*H04N 19/00* (2014.01)
*H04N 19/172* (2014.01)
*G06N 20/00* (2019.01)

(52) U.S. Cl.
CPC ............. *H04N 19/30* (2014.11); *G06N 20/00* (2019.01); *H04N 19/172* (2014.11)

(58) Field of Classification Search
None
See application file for complete search history.

(56) References Cited

U.S. PATENT DOCUMENTS

2021/0174162 A1* 6/2021 Le .................... G06N 3/0454
2022/0012499 A1* 1/2022 Wu .................... G06V 20/41

OTHER PUBLICATIONS

Escorcia et al, "Temporal Localization of Moments in Video Collections with Natural Language", arXiv:1907v1, Jul. 30, 2019, 14 pages.
Lei et al, "TVR: A Large-Scale Dataset for Video-Subtitle Moment Retrieval", arXiv:2001v2, Aug. 18, 2020, 35 pages.

(Continued)

*Primary Examiner* — Samuel D Fereja
(74) *Attorney, Agent, or Firm* — Dority & Manning, P.A.

(57) ABSTRACT

A computer-implemented method for generating video representations utilizing a hierarchical video encoder includes obtaining a video, wherein the video includes a plurality of frames, processing each of the plurality of frames with a machine-learned frame-level encoder model to respectively generate a plurality of frame representations for the plurality of frames, the plurality of frame representations respective to the plurality of frames determining a plurality of segment representations representative of a plurality of video segments including one or more of the plurality of frames, the plurality of segment representations based at least in part on the plurality of frame representations, processing the plurality of segment representations with a machine-learned segment-level encoder model to generate a plurality of contextualized segment representations, determining a video representation based at least in part on the plurality of contextualized segment representations, and providing the video representation as an output.

20 Claims, 8 Drawing Sheets

(56) References Cited

OTHER PUBLICATIONS

Lu et al, "DEBUG: A Dense Bottom-Up Ground Approach for Natural Language Video Localization", Conference on Empirical Methods in Natural Language Processing and the $9^{th}$ International Joint Conference on Natural Language Processing, Hong Kong, China, Nov. 3-7, 2-19, pp. 5144-5153.

Sun et al. "VideoBERT: A Joint Model for Video and Language Representation Learning", arXiv:1904v2, Sep. 11, 2019, 13 pages.

* cited by examiner

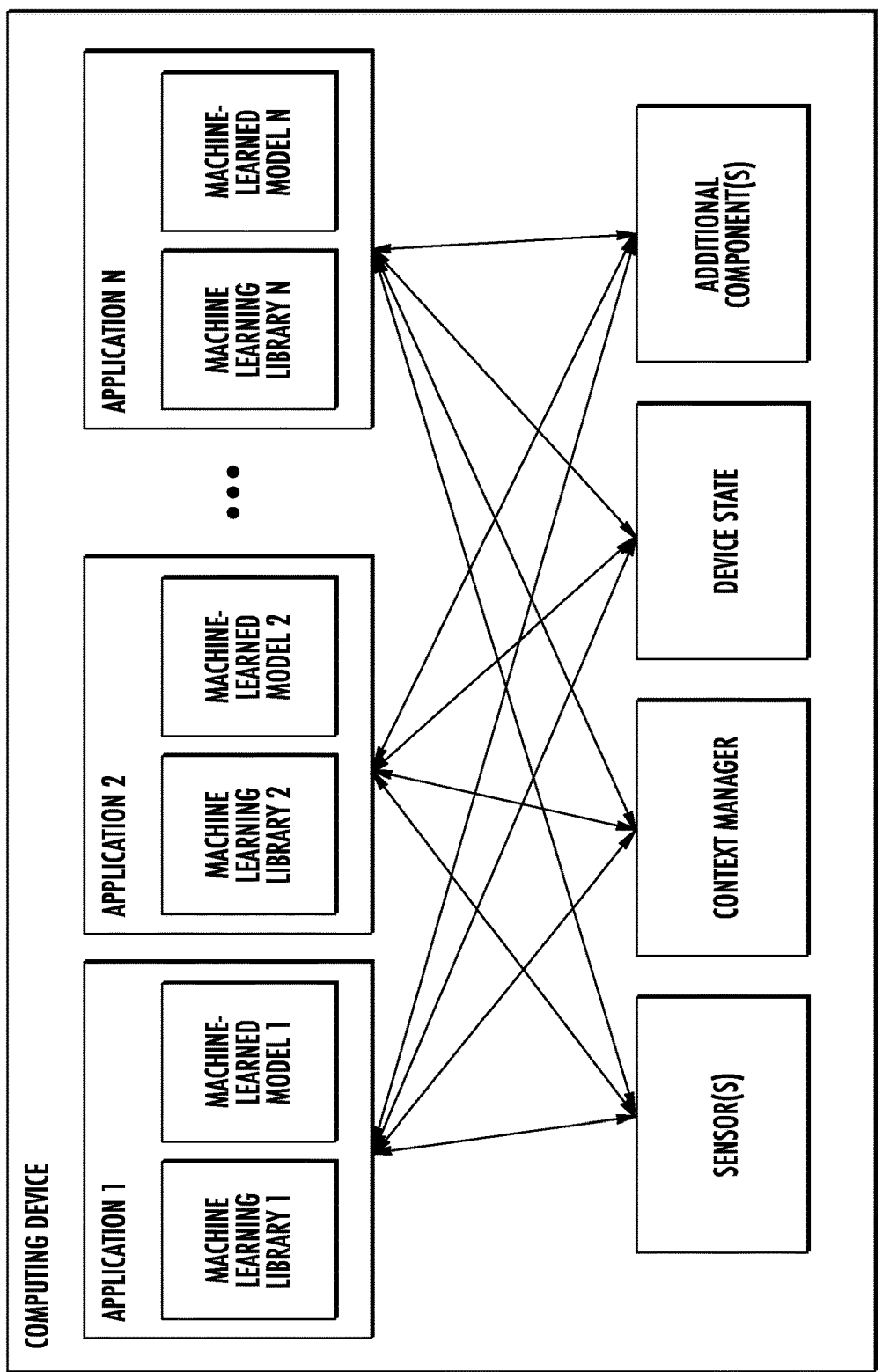

HIERARCHICAL VIDEO ENCODERS

FIELD

The present disclosure relates generally to hierarchical video encoders. More particularly, the present disclosure relates to hierarchical video encoding for moment localization in a corpus of video data.

BACKGROUND

Video content can be stored and/or shared online with a variety of users. As an amount of video content available online increases, it can be increasingly desirable to provide systems enabling a user to selectively search for desired video content among online sources. Systems such as search engines may be provided that allow a user to input a search query and retrieve results responsive to the search query from one or more distinct sources. Video content may be included among the retrieved results.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating video representations utilizing a hierarchical video encoder. The computer-implemented method can include obtaining, by a computing system including one or more computing devices, a video, wherein the video includes a plurality of frames. The computer-implemented method can include processing, by the computing system, each of the plurality of frames with a machine-learned frame-level encoder model to respectively generate a plurality of frame representations for the plurality of frames, the plurality of frame representations respective to the plurality of frames. The computer-implemented method can include determining, by the computing system, a plurality of segment representations representative of a plurality of video segments including one or more of the plurality of frames, the plurality of segment representations based at least in part on the plurality of frame representations. The computer-implemented method can include processing, by the computing system, the plurality of segment representations with a machine-learned segment-level encoder model to generate a plurality of contextualized segment representations. The computer-implemented method can include determining, by the computing system, a video representation based at least in part on the plurality of contextualized segment representations. The computer-implemented method can include providing, by the computing system, the video representation as an output.

Another example aspect of the present disclosure is directed to a computer-implemented method for moment localization in a video corpus including a plurality of videos. The computer-implemented method can include obtaining, by a computing system including one or more computing devices, a user query, the user query including text. The computer-implemented method can include identifying, by the computing system, one or more highest likelihood videos of the plurality of videos, each highest likelihood video of the one or more highest likelihood videos identified based at least in part on a video-query compatibility score between the user query and a video representation of the highest likelihood video that is output by a machine-learned hierarchical video encoder model. The computer-implemented method can include determining, by the computing system, a moment localization within a matching video of the one or more highest likelihood videos, the moment localization including a moment beginning and a moment end. The moment beginning can include a beginning frame of the matching video, the beginning frame having a frame representation that is classified as representing a beginning of a moment described by the user query. The moment end can include an end frame of the matching video, the end frame having a frame representation that is classified as representing an end of the moment described by the user query.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1B depicts a block diagram of an example computing device that performs hierarchical video encoding according to example embodiments of the present disclosure.

Figure 1A:
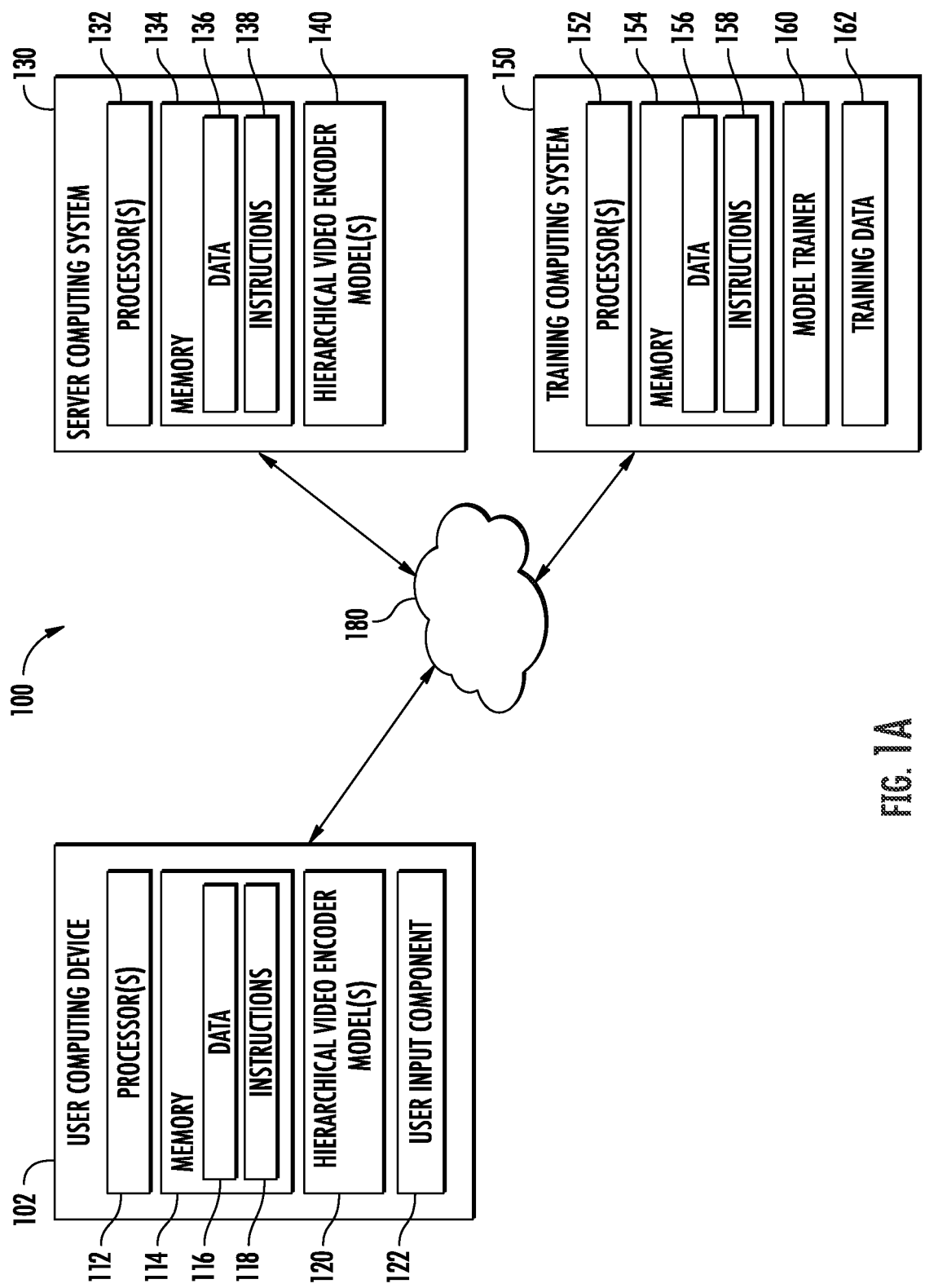
FIG. 1A depicts a block diagram of an example computing system that performs hierarchical video encoding according to example embodiments of the present disclosure.

Reference numerals that are repeated across plural figures are intended to identify the same features in various implementations.

DETAILED DESCRIPTION

Generally, the present disclosure is directed to hierarchical video encoders. Additionally and/or alternatively, the present disclosure is directed to systems and methods for moment localization in a video corpus using representations from hierarchical video encoders. Conceptually, a video can be represented as a sequence of (e.g., fixed length) video segments or "clips" which, intuitively, serve as memory units representing the semantics of one or more frames in the video segment. Each video segment can be a nonoverlapping set of one or more frames of a larger video. As used herein, a "frame" with respect to a video refers to audio, visual, and/or captioning/transcript data associated with a (e.g., smallest) temporal slice of the video. For instance, a video may be composed of at least a (e.g., temporally linear) sequence of frames, where each frame includes an image, a portion of a stream of audio data to be played along with the sequence of images, and/or supplementary text (e.g., captioning) to be displayed along with the sequence of images.

The hierarchical video encoders as described herein include a hierarchy of two (or more) encoder models, such as Transformers (e.g., cross-attentional transformers). A lower-level intrasegment encoder (also referred to as a frame-level encoder) encodes frame-level information of video data (e.g., video frames or representations thereof) into frame representations. Segment representations for video segments can be determined based on these frame representations, such as by providing a context token for a given video segment based on the frame representations of frames in that video segment. A higher-level intersegment encoder (also referred to as a segment-level encoder) encodes the segment representations into contextualized segment representations, which can further be used to produce a video representation. For instance, in some implementations, the hierarchical video encoder model can include a frame-level encoder model configured to receive a plurality of frames of a video as input and provide, in response to receipt of the plurality of frames as input, a plurality of frame representations of the plurality of frames as output. Additionally and/or alternatively, the hierarchical video encoder model can include a segment-level encoder model configured to receive a plurality of segment representations as input and provide, in response to receipt of the plurality of segment representations as input, a plurality of contextualized segment representations as output.

In some implementations, at least one of the frame-level encoder model or the segment-level encoder model can be a multimodal encoder configured to produce a plurality of representations based at least in part on associated text. For instance, in addition to encoding the video data and/or representations thereof, the encoder(s) (e.g., the lower-level encoder and/or the higher level encoder) can be cross-modal encoders that additionally fuse the video data and/or representations thereof with associated text data, such as, for example, captioning data for the video and/or query data descriptive of a user query representing a user's search for videos and/or, more particularly, content depicted within the videos. For instance, in the encoder(s), the input modality pairs can have cross attention, such as visual-caption/transcript, visual-query, and/or transcript-query attention. In some implementations, the associated text can be encoded (e.g., by a text encoder model, such as a text transformer).

The following notational conventions will be used herein for the purposes of illustrating example aspects of the present disclosure. It should be understood that the following conventions, although illustrative, are not intended to limit or exclusively construe any example aspects of the present disclosure, and are provided only for the illustration of mathematical and/or other concepts.

Let a video be denoted by v, and the total number of frames in the video v be noted by N. Additionally, let the (e.g., fixed) length of each video segment be denoted by M. M can be selected based on the task and/or dataset used. Let a query be denoted by h. A lower-level cross-attentional encoder $\Phi$ can receive as input a frame sequence of a video segment $u_k$ and the query h and output, in response, contextualized frame-level features $x_t$ by $\{\Phi(x_t; u_k, h|t=1, 2, \ldots M)\}$ for each video segment $u_k$. A segment representation $\varphi_k$ of the frames of each video segment can be determined for each video segment based on the frame-level features in the segment. As one example, the segment representation can be represented by $\varphi_k = \Phi(V\ CLS_k; u_k, h)$ where $V\ CLS_k$ is a context token (e.g., a visual CLS frame) associated with a video segment $u_k$. These segment representations for each video segment can be input (e.g., as a sequence and/or in addition to the query h) to a higher-level cross-attention encoder $\Psi$. The higher-level encoder $\Psi$ can output, in response, contextualized segment level features $\{\Psi(\varphi_k; v, h|k=1, 2, \ldots N/M)\}$. In this way, the hierarchical video encoder intuitively learns the segment representations using local (intra-segment) self- and/or cross-attention among the frames belonging to the same video segment by the lower-level encoder, while the high-level encoder learns the video representation using global (inter-segment) self- and cross-attention among the video segments of the video.

In some implementations, the machine-learned frame-level encoder model and the machine-learned segment-level encoder model can include one or more shared parameters. For instance, in some implementations, the models may be separately utilized but have some or all common parameters between the models such that the models are similar or identical. In some implementations, each model can have entirely unique parameters.

For instance, the hierarchical video encoder models described herein can be employed in a computer-implemented method for generating video representations. The method can include obtaining (e.g., by a computing system including one or more computing devices) a video, wherein the video includes a plurality of frames. Each frame can include visual data (e.g., an image) and/or associated audio data (e.g., a slice of an audio stream). The video may be unsegmented, such that no temporal divisions exist in the video. The video may be, for example, accessed from a corpus of videos, such as a content sharing website, media provider, database, and/or other suitable corpus.

Additionally, the method can include processing (e.g., by the computing system) each of the plurality of frames with a machine-learned frame-level encoder model to respectively generate a plurality of frame representations for the plurality of frames. The plurality of frame representations can be respective to the plurality of frames. For instance, each frame representation can be produced from a respective (e.g., unique) frame of the plurality of frames.

In some implementations, the frame-level encoder model can be a multimodal encoder model configured to produce the plurality of frame representations based at least in part on associated text (e.g., a user query, captioning for the video, etc.). For instance, the method can include processing (e.g., by the computing system) the associated text with the machine-learned frame-level encoder model to produce the plurality of frame representations, wherein the plurality of frame representations are based at least in part on the associated text. The associated text can be processed concurrently with the plurality of frames. In some implementations, the associated text can be encoded.

Additionally, the method can include determining (e.g., by the computing system) a plurality of segment representations representative of a plurality of video segments including one or more of the plurality of frames. In some implementations, the plurality of video segments can each have about equal length. For instance, in some implementations, a video may be divided into video segments based at least in part on a fixed segment length. In some implementations, the plurality of video segments may be non-overlapping. For instance, a given frame may be included within only one video segment of the plurality of video segments.

The plurality of segment representations can be based at least in part on the plurality of frame representations. In some implementations, the plurality of segment representations can include a context token. As one example, the plurality of frame representations can be, can include, or can otherwise be used to generate a contextualized frame representation, such as a context (e.g., CLS) token specific to each frame. The context tokens for each frame can be aggregated or otherwise combined to produce a segment representation for a video segment including the frames for which the context tokens are combined.

Additionally, the method can include processing (e.g., by the computing system) the plurality of segment representations with a machine-learned segment-level encoder model to generate a plurality of contextualized segment representations. The contextualized segment representation can include a context (e.g., CLS) token specific to the respective video segment. In some cases, processing the plurality of segment representations can include processing (e.g., by the computing system) the associated text with the machine-learned segment-level encoder model to produce the plurality of contextualized segment representations. The plurality of contextualized segment representations can thus be based at least in part on the associated text.

Additionally, the method can include determining (e.g., by the computing system), based at least in part on the plurality of contextualized segment representations, a video representation. For instance, in some implementations, context tokens corresponding to each segment in a video can be aggregated or otherwise combined to produce the video representation. Additionally, the method can include providing (e.g., by the computing system) the video representation as an output (e.g., of the hierarchical video encoder model).

Hierarchical video encoders as described herein can be useful in a variety of computing tasks. One example task relates to identifying and localizing a moment relevant to a user query (e.g., a text query) from a corpus of videos, which may be untrimmed and/or unsegmented. As one example, in some cases, a user query may be a single query sentence describing a relatively small portion within a larger video. For instance, a user searching in response to a user query may wish to see particular moments of a longer video in response to the user query, such as to see only segments of the video depicting content that is relevant to the query. As one example, a video titled "how to cook chicken parmesan" and depicting steps of making chicken parmesan may include a portion dedicated to a step of butterflying chicken. Thus, a user searching with a query such as "how to butterfly chicken" may desire to view the video titled "how to cook chicken parmesan" despite the apparent lack of relationship between video title and content. Desirably, the user may be presented with the portion of the video (e.g., the moment) related to butterflying chicken such that the user does not have to manually search for the related content, which may not be immediately apparent to the user. This problem can be complicated as the number of channels (e.g., audio, visual, captioning) continues to scale and/or as a number of videos continues to scale. For instance, some existing approaches can experience decreasing performance (e.g., accuracy) as a number of frames irrelevant to a user query in a video increases.

This problem has been termed "moment localization in video corpus" or MLVC. As video content available online continues to grow, it has become increasingly desirable and increasingly difficult to thoroughly manage and categorize the ever-increasing corpus of video content. For instance, to effectively and efficiently search, browse, or otherwise navigate through a corpus of videos, an intelligent system must understand rich and complex semantic information included in the videos. These videos can have a significant variation in factors such as content type, length, appearance, quality, and other factors. In addition, the MLVC problem can generally require a more fine-grained understanding of video content than, for example, video retrieval. For instance, localizing a moment responsive to a user query can require semantic understanding of many possible segments of videos. Some existing approaches to handle this problem pre-segment a larger video into smaller chunks. However, this approach can have issues such as microsegments. Furthermore, existing approaches that depend on a squared average of number of frames can be infeasible for large corpuses of videos and/or having a large number of frames. Furthermore, some existing solutions may pack information of different granularity into a single vector embedding, making it hard to balance the differing demands between retrieving a long video and localizing a short segment.

To solve the MLVC problem, systems and methods according to example aspects of the present disclosure can first rank videos in a corpus of videos by relevance to a given user query. For instance, a computing system including one or more computing devices can obtain (e.g., from a user) a user query. The user query can include text (e.g., text data). The user query can be obtained in any suitable manner according to example aspects of the present disclosure. As one example, the user query can be obtained from a user by providing a user with a text field in which to enter the user query, such as at a search engine service. As another example, the user query can be obtained from an external computing system or other computing device. The user query may be or include only text data, may be or may include speech data (e.g., that is converted into text data) and/or may be or may include any other suitable data. In some cases, the user query can be or can include a short text string (e.g., on the order of fewer than about 20 words) descriptive of a moment within a video.

A number of highest ranking videos (e.g., the K highest ranking videos) can be selected such that moment localization is performed on the highest ranking videos to identify a moment relevant to the user query. For instance, a computing system can identify one or more highest likelihood videos of the plurality of videos. This task of identifying the highest ranking video(s) is referred to herein as Video Retrieval, or VR. Performing the VR task can primarily be useful in reducing computational requirements by restricting a number of videos that must be searched for moment localization.

In some implementations, each highest likelihood video of the one or more highest likelihood videos can be identified based at least in part on a video-query compatibility score between the user query and a video representation of the highest likelihood video that is output by a machine-learned hierarchical video encoder model, as described herein. For instance, the video-query compatibility score can effectively rank the corpus of videos and the K highest scoring video(s) in the corpus, as defined by the video-query compatibility score, can be selected as the highest likelihood video(s). In some implementations, the video representation of a highest likelihood video can be based at least in part on a highest scoring segment representation of a plurality of segment representations of the highest likelihood video. For instance, the hierarchical video encoder may output a plurality of segment representations associated with a plurality of video segments of the highest scoring videos, each of which has an associated compatibility score with the user query. The highest score of these compatibility scores can be used as representative of the entire video. In some implementations, the one or more highest likelihood videos can be selected based at least in part on a negative log-likelihood of the one or more highest likelihood videos containing the moment described by the user query. For instance, the videos can be selected to minimize the negative log-likelihood.

A modeling objective for the video retrieval task can select a matching video most likely to have a moment to be localized by employing a contrastive loss that contrasts a compatibility score of positive (e.g., matching) pairs of video representation and query against negative (e.g., not matching) pairs of video representation and query. The negative pairs can be randomly sampled. One example compatibility score is computed as:

$$f(v,h) = \max_k(W_{VR}^T * \Psi(\varphi_k; v, h))$$

where $W_{VR}$ is a linear regressor.

In some cases, the representation of a highest likelihood video can include a highest scoring segment representation of a plurality of segment representations of the highest likelihood video. For instance, of a plurality of segments of the video, the score of the highest-scoring segment can be selected as representative of the entire video. In some implementations, the one or more highest likelihood videos can be selected based at least in part on a negative log-likelihood of the one or more highest likelihood videos containing the moment described by the user query. As one example, the VR loss can be computed as:

$$\ell^{VT} = -\sum_i \log P(v^{(i)} | h^{(i)})$$

where $v^{(i)}$ is a ground-truth video for a text query $h^{(i)}$. Essentially, the hierarchical video encoder model can parameterize the conditional probability $P(v|h)$ for the video retrieval task by providing a hierarchically-learned video representation for a video v.

Once the highest ranking video(s) are selected, moment(s) within the videos related to the user query can be localized. For instance, a moment localization can be determined for a moment, where the moment localization specifies a beginning and/or an end of the moment. As one example, the moment localization can be or can include timestamps, frame indices, etc. This task is referred to as Moment Localization in Single Video, or MLSV. The hierarchical video encoders as described herein can be jointly trained on both tasks in a multitask learning configuration. The hierarchical (e.g., and cross-attentional) encoders as described herein can be beneficial for these tasks, as the two tasks can require understanding semantics of a video at differing temporal resolutions, and the models described herein can model short-range and long-range video semantics. For instance, the hierarchical video encoders described herein can learn semantic understanding for at least three scales: frame-level, segment-level, and/or video-level. For example, including segment-level encoders as described herein can provide for capturing both coarse- and fine-grained semantic information in videos.

Additionally, one or more classifiers can be applied to identify regions (e.g., frames) corresponding to a beginning and/or an end of a relevant video segment. For instance, a lower-level classifier (e.g., a per-frame classifier) can be used to classify a probability of each frame of being a starting frame and/or an ending frame. A higher-level classifier (e.g., at the segment level or video level) can classify a probability of a starting frame and/or an ending frame being located within a segment and/or video. As one example, the probability of a frame being a start frame can be represented by:

$$P(t^{start}|v, h) = \sum_k P(t^{start}|u_k, h) * P(k|v, h) \text{ where}$$

$$P(t^{start}|u_k, h) = W_{start}^T * [\Phi(x_t; u_k, h), \Phi(T; u_k, h)] \text{ and}$$

$$(k|v, h) = U_{start}^T [\Psi(\varphi_k; v, h), \Psi(\varphi_k; v, h)]$$

where start $W_{start}$ is a (e.g., linear) frame-level classifier and $U_{start}$ is a (e.g., linear) video-level classifier. Similarly, the probability of a frame t being an end frame can be represented by:

$$P(t^{end}|v, h) = \sum_k P(t^{end}|u_k, h) * P(k|v, h) \text{ where}$$

$$P(t^{end}|u_k, h) = W_{end}^T * [\Phi(x_t; u_k, h), \Phi(T; u_k, h)] \text{ and}$$

$$(k|v, h) = U_{end}^T [\Psi(\varphi_k; v, h), \Psi(\varphi_k; v, h)]$$

where $W_{end}$ is a (e.g., linear) frame-level classifier and $U_{end}$ is a (e.g., linear) video-level classifier.

Moment localization can thus essentially be treated as a frame classification problem. For instance, each frame can be classified as belonging to one of three labels: a beginning frame, which marks the beginning of a moment localization; an end frame, which marks the end of a moment localization; and an other frame that may or may not be included within a moment localization for a given moment, but is not bordering a moment. Additionally, a loss during training of the hierarchical video encoder model can include a cross-entropy loss between a predicted classification of each frame and a true label of each frame. As one example, the training loss can be expressed as:

$$\ell^{TL} = -\sum_i \sum_t f_t^{(i)} \log P(y_t^{(i)} | v^{(i)}, h^{(i)})$$

where $f_t^{(i)}$ is a true label for a frame $x_t$ and $y_t^{(i)}$ is a predicted label of the frame $x_t$. Essentially, the hierarchical video encoder can provide parameterization of the labeling model $P(y_t^{(i)}|v^{(i)}, h^{(i)})$ for the moment localization task.

The hierarchical video encoders as described herein can perform the two tasks of VR and MLSV at the temporal resolution required for the respective task. For instance, in some cases for the MLVC task, the user query is a sentence describing some fraction of the video content. Therefore, at the frame level representation, there are a number of frames that are irrelevant to the query, resulting in low signal-to-noise ratio for the VR task. By learning segment-level representations, the encoders learn a more coarse-grained matching between the video and the query which filters out the noise. Hence, for the VR task, it may be possible to use the learned representations only at the higher-level (e.g., video segment). The MLSV task can benefit from a fine-grained frame-level representation, providing for computing the start and end probabilities of each frame. Thus, for the MLSV task, conditional probabilities can be computed at the lower-level (frame). The hierarchical video encoding provides for learning the two tasks of VR and MLSV simultaneously in a joint training setup while still learning the respective objectives at the desired temporal resolution.

The hierarchical video encoders as described herein can be beneficial for video search applications, such as retrieving specific segments of a longer video that are relevant to a given user query. In addition to and/or alternatively to video search applications, the hierarchical video encoders can be useful for learning topical compositions of videos. Improved knowledge of topical compositions of videos can be useful for assisting in the placement of anchor points throughout videos that may be useful, for example, for annotation placement, navigability, etc. As an example, a user can be provided with navigation options based on the topical content. The improved knowledge of topical compositions or content of videos can additionally be useful for learning annotations for semantically meaningful video segments for indexing to aid quick retrieval. As another example, the hierarchical video encoders as described herein can be useful for ad placement within a video. For instance, the content of the video can be understood such that ad content can be strategically placed relative to content of a video.

Systems and methods according to example aspects of the present disclosure can provide for a number of technical effects and benefits, including improvements to computing technology. As one example, systems and methods according to example aspects of the present disclosure can have improved generality. For instance, in contrast to some existing approaches, the hierarchical video encoders as described herein can be robust to length of videos, such as by requiring no assumption about any length of the video segments to be localized, which can provide for improved generality to all lengths of videos. As another example, systems and methods according to example aspects of the present disclosure can have improved scalability. For instance, the hierarchical video encoders as described herein can be useful as an amount of content available online continues to grow. For example, the hierarchical video encoders as described herein can be used to pre-compute representations of lengthy and computationally daunting video content such that the content can be organized and provided to users. As another example, the use of hierarchical video encoders as described herein can have reduced processing time compared to some existing approaches.

With reference now to the Figures, example embodiments of the present disclosure will be discussed in further detail.

FIG. 1A depicts a block diagram of an example computing system 100 that performs hierarchical video encoding according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more hierarchical video encoder models 120. For example, the hierarchical video encoder models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example hierarchical video encoder models 120 are discussed with reference to FIGS. 2 through 5.

In some implementations, the one or more hierarchical video encoder models 120 can be received from the server computing system 130 over network 180, stored in the user computing device memory 114, and then used or otherwise implemented by the one or more processors 112. In some implementations, the user computing device 102 can implement multiple parallel instances of a single hierarchical video encoder model 120 (e.g., to perform parallel hierarchical video encoding across multiple instances of a hierarchical video encoding task).

More particularly, the hierarchical video encoder models 120 as described herein include a hierarchy of two (or more) encoder models, such as Transformers (e.g., cross-attentional transformers). A lower-level intrasegment encoder (also referred to as a frame-level encoder) encodes frame-level information of video data (e.g., video frames or representations thereof) into frame representations. Segment representations for video segments can be determined based on these frame representations, such as by providing a context token for a given video segment based on the frame representations of frames in that video segment. A higher-level intersegment encoder (also referred to as a segment-level encoder) encodes the segment representations into contextualized segment representations, which can further be used to produce a video representation. For instance, in some implementations, the hierarchical video encoder model 120 can include a frame-level encoder model configured to receive a plurality of frames of a video as input and provide, in response to receipt of the plurality of frames as input, a plurality of frame representations of the plurality of frames as output. Additionally and/or alternatively, the hierarchical video encoder model 120 can include a segment-level encoder model configured to receive a plurality of segment representations as input and provide, in response to receipt of the plurality of segment representations as input, a plurality of contextualized segment representations as output.

Additionally or alternatively, one or more hierarchical video encoder models 140 can be included in or otherwise stored and implemented by the server computing system 130 that communicates with the user computing device 102 according to a client-server relationship. For example, the hierarchical video encoder models 140 can be implemented by the server computing system 140 as a portion of a web service (e.g., a hierarchical video encoding service, image search service, etc.). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more hierarchical video encoder models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2 through 5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the hierarchical video encoder models 120 and/or 140 based on a set of training data 162. The training data 162 can include, for example, a corpus or dataset of videos, including video data. The training data 162 may be labeled with ground truth information such as, for example, ground truth moment localizations (e.g., an actual beginning and/or end of a moment), such as ground truth frame labels. Additionally and/or alternatively, the training data can include known positive and/or negative pairs of videos and queries.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases, including, for example, VR tasks and/or MLVC tasks.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data). In some cases, the input includes audio data representing a spoken utterance and the task is a speech recognition task. The output may comprise a text output which is mapped to the spoken utterance. In some cases, the task comprises encrypting or decrypting input data.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
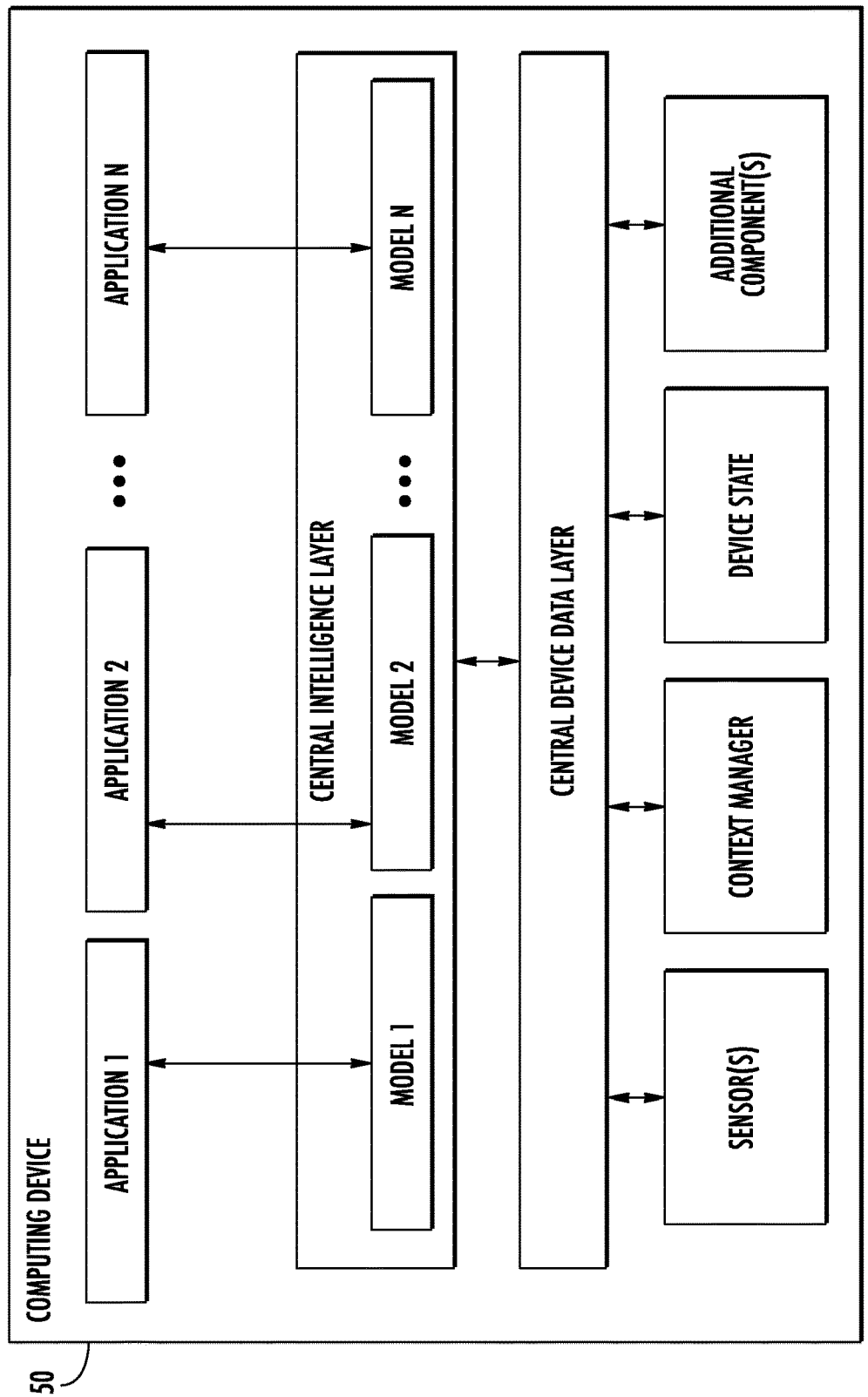
FIG. 1C depicts a block diagram of an example computing device that performs hierarchical video encoding according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG.

1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
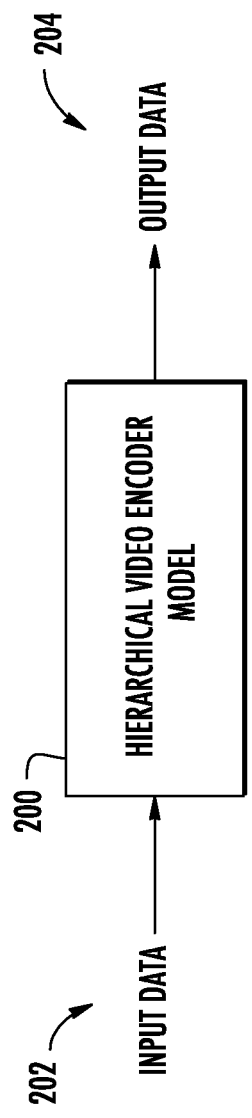
FIG. 2 depicts a block diagram of an example hierarchical video encoder model according to example embodiments of the present disclosure.

FIG. 2 depicts a block diagram of an example hierarchical video encoder model 200 according to example embodiments of the present disclosure. In some implementations, the hierarchical video encoder model 200 is trained to receive a set of input data 202 descriptive of a video and/or a user query and, as a result of receipt of the input data 202, provide output data 204 that includes, for example, a plurality of frame representations, a plurality of segment representations, and/or a video representation based on the video. According to example aspects of the present disclosure, a hierarchical structure of encoders can provide semantic understanding in the form of representations at various levels of a video, as described herein.

Figure 3:
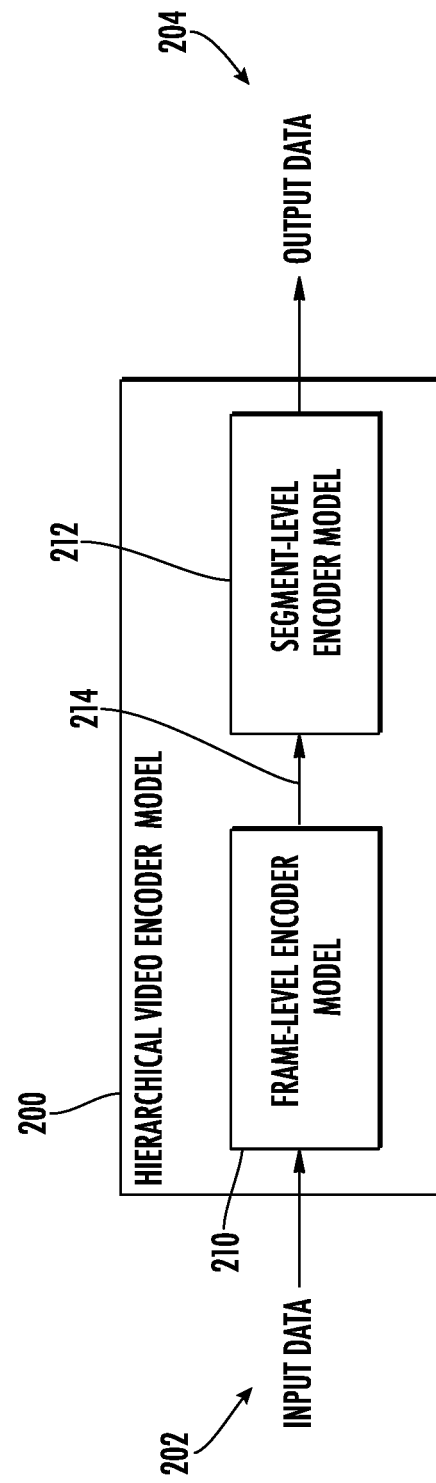
FIG. 3 depicts a block diagram of an example hierarchical video encoder model according to example embodiments of the present disclosure.

FIG. 3 depicts a block diagram of an example hierarchical video encoder model 200 according to example embodiments of the present disclosure. As depicted in FIG. 3, in some implementations, the hierarchical video encoder model 200 can further include a frame-level encoder model 210 and a segment-level encoder model 212. For instance, the input data 202 can be provided to frame-level encoder model 210 to produce frame representations 214. Segment representations derived from the frame representations 214 can be provided to segment-level encoder model 212 to produce the output data 204, such as contextualized segment representations and/or a video representation of the output data 204.

Figure 4:
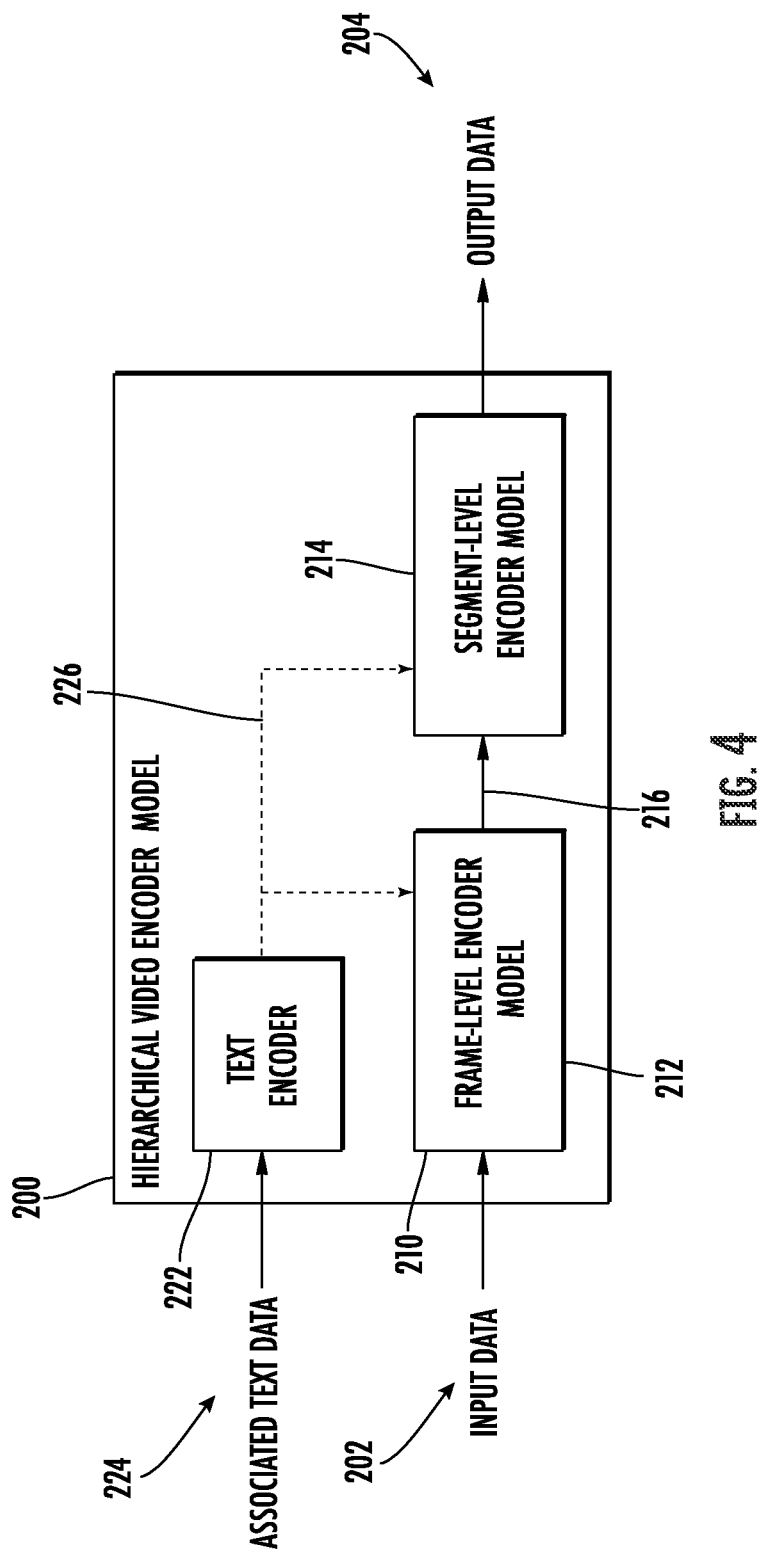
FIG. 4 depicts a block diagram of an example hierarchical video encoder model according to example embodiments of the present disclosure.

FIG. 4 depicts a block diagram of an example hierarchical video encoder model 200 according to example embodiments of the present disclosure. As depicted in FIG. 4, in some implementations, the hierarchical video encoder model can further be configured to receive associated text data 224 in addition to input data 202 (e.g., video data). The associated text data 224 can be encoded by text encoder 222. The text encoder 222 can produce encoded associated text 226, which can be a representation of associated text data 224 that can be used (e.g., in a cross-attention mechanism) by frame-level encoder model 212 and/or segment-level encoder model 214. In this way, predictions from frame-level encoder model 212 and/or segment-level encoder model 214 can be based at least in part on context provided by associated text data 224 (e.g., video captioning, user query, etc.).

Figure 5:
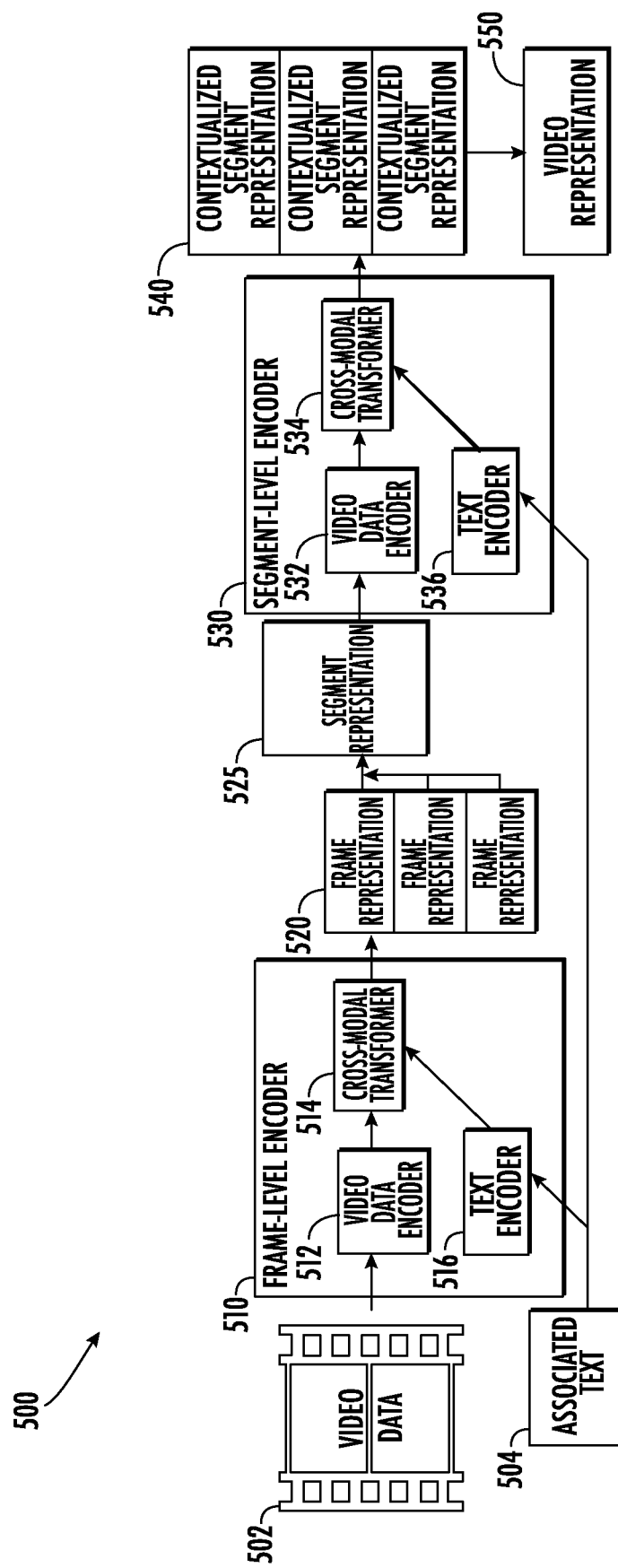
FIG. 5 depicts a block diagram of an example hierarchical video encoder model according to example embodiments of the present disclosure.

FIG. 5 depicts a block diagram of an example hierarchical video encoder model 500 according to example embodiments of the present disclosure. The hierarchical video encoder model can be configured to produce representations of video data 502. Video data 502 can be represented as a sequence of (e.g., fixed length) video segments or "clips" which, intuitively, serve as memory units representing the semantics of one or more frames in the video segment. Each video segment can be a nonoverlapping set of one or more frames of a larger video. As used herein, a "frame" with respect to a video refers to audio, visual, and/or captioning/transcript data associated with a (e.g., smallest) temporal slice of the video. For instance, a video of video data 502 may be composed of at least a (e.g., temporally linear) sequence of frames, where each frame includes an image, a portion of a stream of audio data to be played along with the sequence of images, and/or supplementary text (e.g., captioning) to be displayed along with the sequence of images.

The hierarchical video encoder model 500 includes a hierarchy of two (or more) encoder models. The frame-level encoder 510 encodes frame-level information of video data 502 (e.g., video frames or representations thereof) into frame representations 520. Segment representations 525 for video segments can be determined based on these frame representations 520, such as by providing a context token for a given video segment based on the frame representations 520 of frames in that video segment. Segment-level encoder 530 then encodes the segment 525 representations into contextualized segment representations 540, which can further be used to produce a video representation 550.

As illustrated in FIG. 5, the frame-level encoder model 510 and the segment-level encoder model 530 can be a multimodal encoder configured to produce a plurality of representations (e.g., 520, 540) based at least in part on associated text 504 (e.g., a user query). For instance, in addition to encoding the video data 502 and/or representations thereof, the encoder(s) 510, 530) can be cross-modal encoders that additionally fuse the video data 502 and/or representations thereof with associated text data 504, such as, for example, captioning data for the video and/or query data descriptive of a user query representing a user's search for videos and/or, more particularly, content depicted within the videos. For instance, in the encoder(s) 510, 530, the input modality pairs can have cross attention, such as visual-caption/transcript, visual-query, and/or transcript-query attention. In some implementations, the associated text can be encoded by a text encoder model 516, 536, such as a text transformer, prior to being fused with the video data 502.

For instance, at frame-level encoder 510, the video data 502 is first encoded by video data encoder 512. Additionally, associated text data 504 is encoded by text encoder model 516. Cross-modal transformer 514 then produces frame representations 520 based on cross-attention between the encoded video data 502 from video data encoder 512 and encoded associated text data 504 from text encoder model 516. Similarly, at segment-level encoder 530, the segment representation(s) 525 are first encoded by video data encoder 532. Associated text data 504 can again be encoded, by a same model as for frame-level encoder 510 (e.g., text encoder 516) and/or a second text encoder model 536. Cross-modal transformer 534 then produces contextualized segment representations 540 based on cross-attention between the encoded segment representations 525 from video data encoder 532 and encoded associated text data from text encoder model 536.

Figure 6:
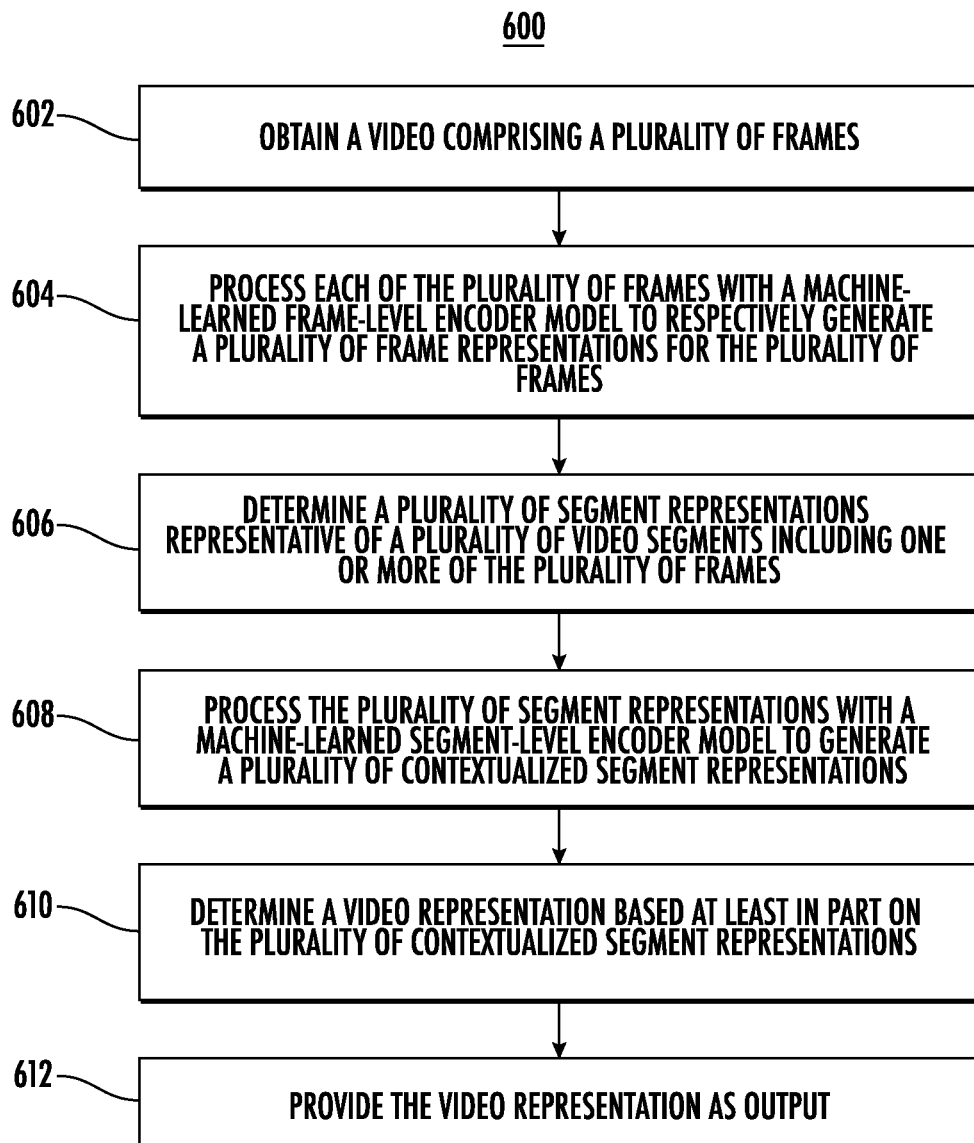
FIG. 6 depicts a flow chart diagram of an example method for generating video representations utilizing a hierarchical video encoder according to example embodiments of the present disclosure.

FIG. 6 depicts a flow chart diagram of an example method 600 for generating video representations utilizing a hierarchical video encoder according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The method 600 can include, at 602, obtaining (e.g., by a computing system including one or more computing devices) a video, wherein the video includes a plurality of frames. Each frame can include visual data (e.g., an image) and/or associated audio data (e.g., a slice of an audio stream). The video may be unsegmented, such that no temporal divisions exist in the video. The video may be, for example, accessed from a corpus of videos, such as a content sharing website, media provider, database, and/or other suitable corpus.

Additionally, the method 600 can include, at 604, processing (e.g., by the computing system) each of the plurality of frames with a machine-learned frame-level encoder model to respectively generate a plurality of frame representations for the plurality of frames. The plurality of frame representations can be respective to the plurality of frames. For instance, each frame representation can be produced from a respective (e.g., unique) frame of the plurality of frames.

In some implementations, the frame-level encoder model can be a multimodal encoder model configured to produce the plurality of frame representations based at least in part on associated text (e.g., a user query, captioning for the video, etc.). For instance, the method 600 can include processing (e.g., by the computing system) the associated text with the machine-learned frame-level encoder model to produce the plurality of frame representations, wherein the plurality of frame representations are based at least in part on the associated text. The associated text can be processed concurrently with the plurality of frames. In some implementations, the associated text can be encoded.

Additionally, the method 600 can include, at 606, determining (e.g., by the computing system) a plurality of segment representations representative of a plurality of video segments including one or more of the plurality of frames. In some implementations, the plurality of video segments can each have about equal length. For instance, in some implementations, a video may be divided into video segments based at least in part on a fixed segment length. In some implementations, the plurality of video segments may be nonoverlapping. For instance, a given frame may be included within only one video segment of the plurality of video segments.

The plurality of segment representations can be based at least in part on the plurality of frame representations. In some implementations, the plurality of segment representations can include a context token. As one example, the plurality of frame representations can be, can include, or can otherwise be used to generate a contextualized frame representation, such as a context (e.g., CLS) token specific to each frame. The context tokens for each frame can be aggregated or otherwise combined to produce a segment representation for a video segment including the frames for which the context tokens are combined.

Additionally, the method 600 can include, at 608, processing (e.g., by the computing system) the plurality of segment representations with a machine-learned segment-level encoder model to generate a plurality of contextualized segment representations. The contextualized segment representation can include a context (e.g., CLS) token specific to the respective video segment. In some cases, processing the plurality of segment representations can include processing (e.g., by the computing system) the associated text with the machine-learned segment-level encoder model to produce the plurality of contextualized segment representations. The plurality of contextualized segment representations can thus be based at least in part on the associated text.

Additionally, the method 600 can include, at 610, determining (e.g., by the computing system), based at least in part on the plurality of contextualized segment representations, a video representation. For instance, in some implementations, context tokens corresponding to each segment in a video can be aggregated or otherwise combined to produce the video representation. Additionally, the method 600 can include, at 612, providing (e.g., by the computing system) the video representation as an output (e.g., of the hierarchical video encoder model).

Figure 7:
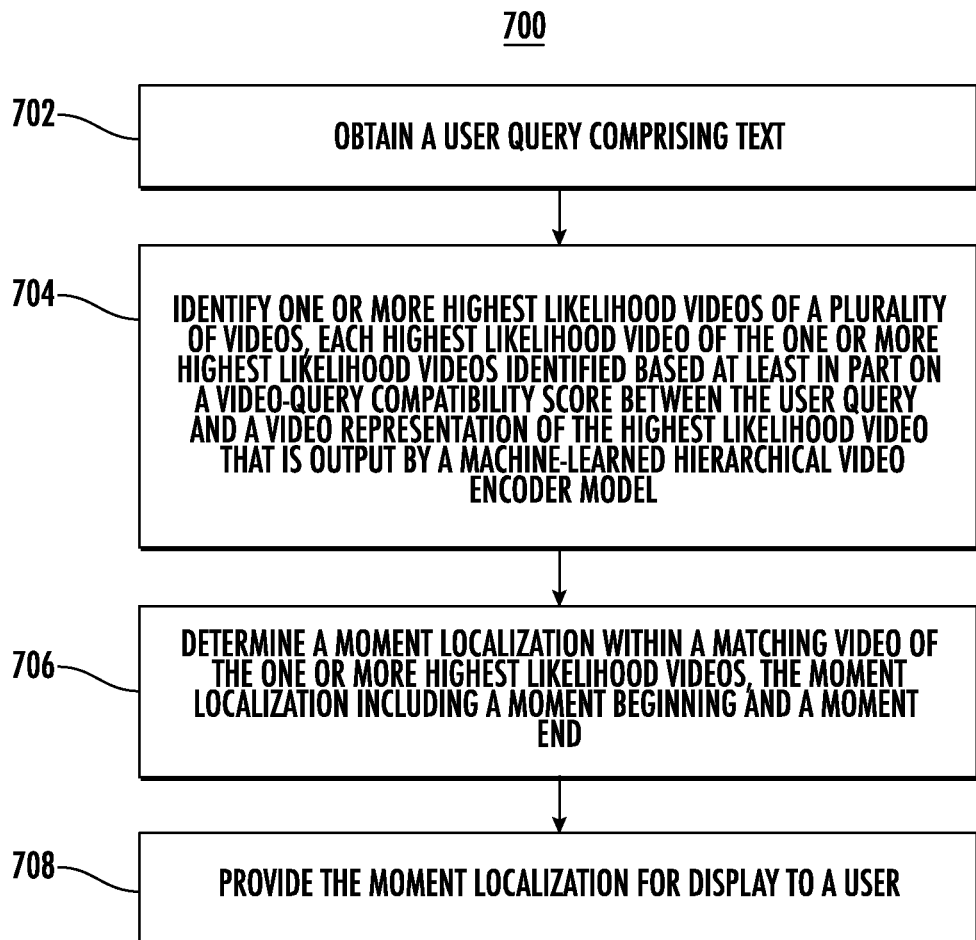
FIG. 7 depicts a flow chart diagram of an example method for moment localization in a video corpus including a plurality of videos according to example embodiments of the present disclosure.

FIG. 7 depicts a flow chart diagram of an example method 700 for moment localization in a video corpus including a plurality of videos according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

The method 700 can include, at 702, obtaining (e.g., by a computing system including one or more computing devices) a user query, such as from a user. The user query can include text (e.g., text data). The user query can be obtained in any suitable manner according to example aspects of the present disclosure. As one example, the user query can be obtained from a user by providing a user with a text field in which to enter the user query, such as at a search engine service. As another example, the user query can be obtained from an external computing system or other computing device. The user query may be or include only text data, may be or may include speech data (e.g., that is converted into text data) and/or may be or may include any other suitable data. In some cases, the user query can be or can include a short text string (e.g., on the order of fewer than about 20 words) descriptive of a moment within a video.

Additionally, the method 700 can include, at 704, identifying (e.g., by the computing system) one or more highest likelihood videos of the plurality of videos. In some implementations, each highest likelihood video of the one or more highest likelihood videos can be identified based at least in part on a video-query compatibility score between the user query and a video representation of the highest likelihood video that is output by a machine-learned hierarchical video encoder model, as described herein. For instance, the video-query compatibility score can effectively rank the corpus of videos and the K highest scoring video(s) in the corpus, as defined by the video-query compatibility score, can be selected as the highest likelihood video(s). In some implementations, the video representation of a highest likelihood video can be based at least in part on a highest scoring segment representation of a plurality of segment representations of the highest likelihood video. For instance, the hierarchical video encoder may output a plurality of segment representations associated with a plurality of video segments of the highest scoring videos, each of which has an associated compatibility score with the user query. The highest score of these compatibility scores can be used as representative of the entire video. In some implementations, the one or more highest likelihood videos can be selected based at least in part on a negative log-likelihood of the one or more highest likelihood videos containing the moment described by the user query. For instance, the videos can be selected to minimize the negative log-likelihood.

A modeling objective for the video retrieval task can select a matching video most likely to have a moment to be localized by employing a contrastive loss that contrasts a compatibility score of positive (e.g., matching) pairs of video representation and query against negative (e.g., not matching) pairs of video representation and query. The negative pairs can be randomly sampled. One example compatibility score is computed as:

$$f(v,h) = \max_k(W_{VR}^T * \Psi(\varphi_k; v, h))$$

where $W_{VR}$ is a linear regressor.

In some cases, the representation of a highest likelihood video can include a highest scoring segment representation of a plurality of segment representations of the highest likelihood video. For instance, of a plurality of segments of the video, the score of the highest-scoring segment can be selected as representative of the entire video. In some implementations, the one or more highest likelihood videos can be selected based at least in part on a negative log-likelihood of the one or more highest likelihood videos containing the moment described by the user query. As one example, the VR loss can be computed as:

$$\ell^{VT} = -\sum_i \log P(v^{(i)} | h^{(i)})$$

where $v^{(i)}$ is a ground-truth video for a text query $h^{(i)}$. Essentially, the hierarchical video encoder model can parameterize the conditional probability $P(v|h)$ for the video retrieval task by providing a hierarchically-learned video representation for a video v.

Additionally, the method 700 can include, at 706, determining a moment localization within a matching video of the one or more highest likelihood videos. For instance, a moment localization can be determined for a moment, where the moment localization specifies a beginning and/or an end of the moment within the matching video. As one example, the moment localization can be or can include timestamps, frame indices, etc. This task is referred to as Moment Localization in Single Video, or MLSV. The hierarchical video encoders as described herein can be jointly trained on both tasks in a multitask learning configuration. The hierarchical (e.g., and cross-attentional) encoders as described herein can be beneficial for these tasks, as the two tasks can require understanding semantics of a video at differing temporal resolutions, and the models described herein can model short-range and long-range video semantics. For instance, the hierarchical video encoders described herein can learn semantic understanding for at least three scales: frame-level, segment-level, and/or video-level. For example, including segment-level encoders as described herein can provide for capturing both coarse- and fine-grained semantic information in videos.

Additionally, one or more classifiers can be applied to identify regions (e.g., frames) corresponding to a beginning and/or an end of a relevant video segment. For instance, a lower-level classifier (e.g., a per-frame classifier) can be used to classify a probability of each frame of being a starting frame and/or an ending frame. A higher-level classifier (e.g., at the segment level or video level) can classify a probability of a starting frame and/or an ending frame being located within a segment and/or video. As one example, the probability of a frame being a start frame can be represented by:

$$P(t^{start}|v, h) = \sum_k P(t^{start}|u_k, h) * P(k|v, h) \text{ where}$$

$$P(t^{start}|u_k, h) = W_{start}^T * [\Phi(x_t; u_k, h), \Phi(T; u_k, h)] \text{ and}$$

$$(k|v, h) = U_{start}^T [\Psi(\varphi_k; v, h), \Psi(\varphi_k; v, h)]$$

where start $W_{start}$ is a (e.g., linear) frame-level classifier and $U_{start}$ is a (e.g., linear) video-level classifier. Similarly, the probability of a frame t being an end frame can be represented by:

$$P(t^{end}|v, h) = \sum_k P(t^{end}|u_k, h) * P(k|v, h) \text{ where}$$

$$P(t^{end}|u_k, h) = W_{end}^T * [\Phi(x_t; u_k, h), \Phi(T; u_k, h)] \text{ and}$$

$$(k|v, h) = U_{end}^T [\Psi(\varphi_k; v, h), \Psi(\varphi_k; v, h)]$$

where $W_{end}$ is a (e.g., linear) frame-level classifier and $U_{end}$ is a (e.g., linear) video-level classifier.

Moment localization can thus essentially be treated as a frame classification problem. For instance, each frame can be classified as belonging to one of three labels: a beginning frame, which marks the beginning of a moment localization; an end frame, which marks the end of a moment localization; and an other frame that may or may not be included within a moment localization for a given moment, but is not bordering a moment. Additionally, a loss during training of the hierarchical video encoder model can include a cross-entropy loss between a predicted classification of each frame and a true label of each frame. As one example, the training loss can be expressed as:

$$\ell^{TL} = -\sum_i \sum_t f_t^{(i)} \log P(y_t^{(i)} | v^{(i)}, h^{(i)})$$

where $f_t^{(i)}$ is a true label for a frame $x_t$ and $y_t^{(i)}$ is a predicted label of the frame $x_t$. Essentially, the hierarchical video encoder can provide parameterization of the labeling model $P(y_t^{(i)}|v^{(i)}, h^{(i)})$ for the moment localization task.

Additionally, in some implementations, the method 700 can optionally include, at 708, providing (e.g., by the computing system) the moment localization for display to a user. As one example, the matching video can be returned to a user providing the user query, such as in the form of search results, etc. In addition to and/or alternatively to displaying the matching video, the user may additionally be provided with the moment localization, such as the beginning and/or the end. As one example, a graphical user interface element depicting a progress bar indicative of a user's position within a video (e.g., by a marker between a beginning and an end of the video) may be highlighted, reduced, or otherwise annotated with a marking element indicative of the location of the moment within the larger video. Additionally and/or alternatively, in some implementations, upon a user selecting the matching video (e.g., from the search results), the user may be provided with the moment localization in the form of video playback being initiated at the moment beginning (e.g., as opposed to the video beginning). Any other suitable form of providing the moment localization for display to a user can be employed in accordance with example aspects of the present disclosure.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for generating video representations utilizing a hierarchical video encoder, the method comprising:
    obtaining, by a computing system comprising one or more computing devices, a video, wherein the video comprises a plurality of frames;
    processing, by the computing system, each of the plurality of frames with a machine-learned frame-level encoder model to respectively generate a plurality of frame representations for the plurality of frames, the plurality of frame representations respective to the plurality of frames;
    determining, by the computing system, a plurality of segment representations representative of a plurality of video segments, wherein each of the plurality of video segments comprise a subset of the plurality of frames that comprise a temporally linear sequence of frames, the plurality of segment representations based at least in part on the plurality of frame representations;
    processing, by the computing system, the plurality of segment representations with a machine-learned segment-level encoder model to generate a plurality of contextualized segment representations, wherein each contextualized segment representation of the plurality of contextualized segment representations comprise segment-level semantic information for a respective video segment;
    determining, by the computing system, a video representation based at least in part on the plurality of contextualized segment representations; and
    providing, by the computing system, the video representation and one or more of the plurality of contextualized segment representations as an output.

2. The computer-implemented method of claim 1, wherein at least one of the frame-level encoder model or the segment-level encoder model is a multimodal encoder configured to produce a plurality of representations based at least in part on associated text; and
    wherein the method further comprises:
    processing, by the computing system, the associated text with the machine-learned frame-level encoder model to produce the plurality of frame representations, wherein the plurality of frame representations are based at least in part on the associated text; and
    processing, by the computing system, the associated text with the machine-learned segment-level encoder model to produce the plurality of contextualized segment representations, wherein the plurality of contextualized segment representations are based at least in part on the associated text.

3. The computer-implemented method of claim 2, wherein the associated text comprises a user query.

4. The computer-implemented method of claim 2, wherein the associated text comprises captioning for the video.

5. The computer-implemented method of claim 2, wherein the associated text is encoded.

6. The computer-implemented method of claim 1, wherein the machine- learned frame-level encoder model and the machine-learned segment-level encoder model comprise one or more shared parameters.

7. The computer-implemented method of claim 1, wherein the plurality of segment representations comprise a context token.

8. The computer-implemented method of claim 1, wherein the plurality of video segments are nonoverlapping.

9. The computer-implemented method of claim 1, wherein the plurality of video segments have about equal length.

10. A computing system, the computing system comprising:
    one or more processors; and
    one or more non-transitory computer-readable media that collectively store instructions that, when executed by the one or more processors, cause the computing system to perform operations, the operations comprising:
    obtaining text data, wherein the text data is descriptive of a search query;
    obtaining a video, wherein the video comprises a plurality of frames;
    processing the text data and each of the plurality of frames with a machine-learned frame-level encoder model to respectively generate a plurality of frame representations for the plurality of frames, the plurality of frame representations respective to the plurality of frames;
    determining a plurality of segment representations representative of a plurality of video segments, wherein each of the plurality of video segments comprise a subset of the plurality of frames that comprise a temporally linear sequence of frames, the plurality of segment representations based at least in part on the plurality of frame representations;
    processing the text data and the plurality of segment representations with a machine-learned segment-level encoder model to generate a plurality of contextualized segment representations;
    determining a video representation based at least in part on the plurality of contextualized segment representations; and
    providing the video representation and one or more of the plurality of contextualized segment representations as an output.

11. The computing system of claim 10, wherein each of the plurality of frame representations comprise frame-level semantic information for a respective frame.

12. The computing system of claim 10, wherein each of the plurality of contextualized segment representations comprise segment-level semantic information for a respective video segment.

13. The computing system of claim 10, wherein the video representation comprises video-level semantic information.

14. The computing system of claim 10, wherein one or more of the plurality of contextualized segment representations comprise coarse-grained semantic information and fine- grained semantic information descriptive of a respective video segment.

15. The computing system of claim 10, wherein the operations further comprise:
   determining a starting frame of a video segment based on the plurality of frame representations.

16. The computing system of claim 15, wherein the operations further comprise:
   determining an ending frame of the video segment based on the plurality of frame representations.

17. The computing system of claim 16, wherein one or more of the plurality of segment representations are generated based in part on the starting frame and the ending frame.

18. The computing system of claim 16, wherein the operations further comprise:
   providing the starting frame and the ending frame with the video representation and the one or more of the plurality of contextualized segment representations.

19. One or more non-transitory computer-readable media that collectively store instructions that, when executed by one or more computing devices, cause the one or more computing devices to perform operations, the operations comprising:

obtaining text data, wherein the text data is descriptive of a search query;

obtaining a video based on the text data, wherein the video comprises a plurality of frames;

processing the text data and each of the plurality of frames with a machine-learned frame-level encoder model to respectively generate a plurality of frame representations for the plurality of frames, the plurality of frame representations respective to the plurality of frames;

determining a plurality of segment representations representative of a plurality of video segments, wherein each of the plurality of video segments comprise a subset of the plurality of frames that comprise a temporally linear sequence of frames, the plurality of segment representations based at least in part on the plurality of frame representations;

processing the text data and the plurality of segment representations with a machine-learned segment-level encoder model to generate a plurality of contextualized segment representations;

determining a video representation based at least in part on the plurality of contextualized segment representations; and providing the video representation and one or more of the plurality of contextualized segment representations as an output.

20. The one or more non-transitory computer-readable media of claim 19, wherein the video is obtained based at least in part on a video title of the video being associated with the search query.

* * * * *